Dec. 1, 1953  L. F. ASHFORD  2,661,100
ARTICLE HANDLING APPARATUS
Filed June 2, 1950  6 Sheets-Sheet 5
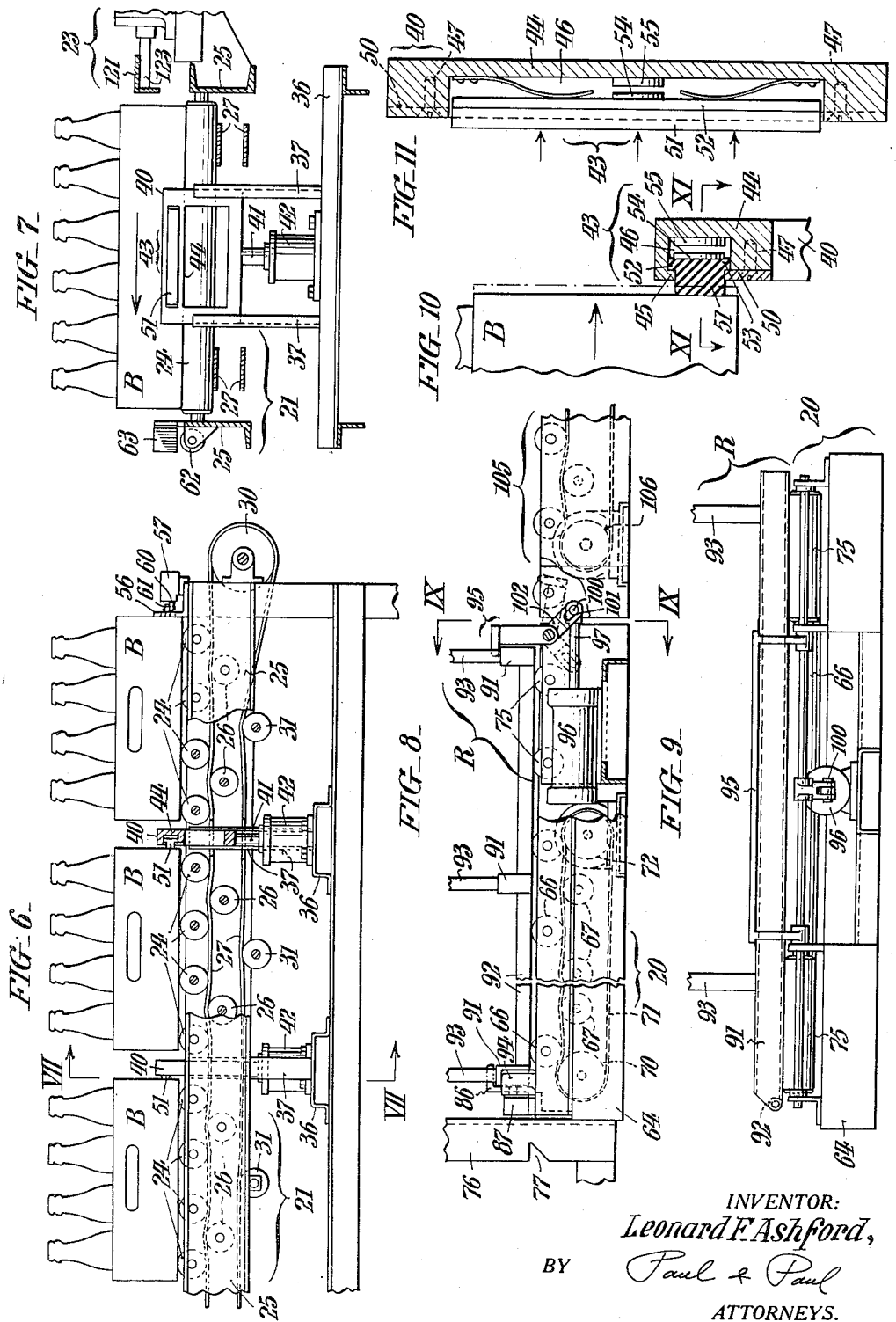
INVENTOR:
Leonard F. Ashford,
BY  Paul & Paul
ATTORNEYS.

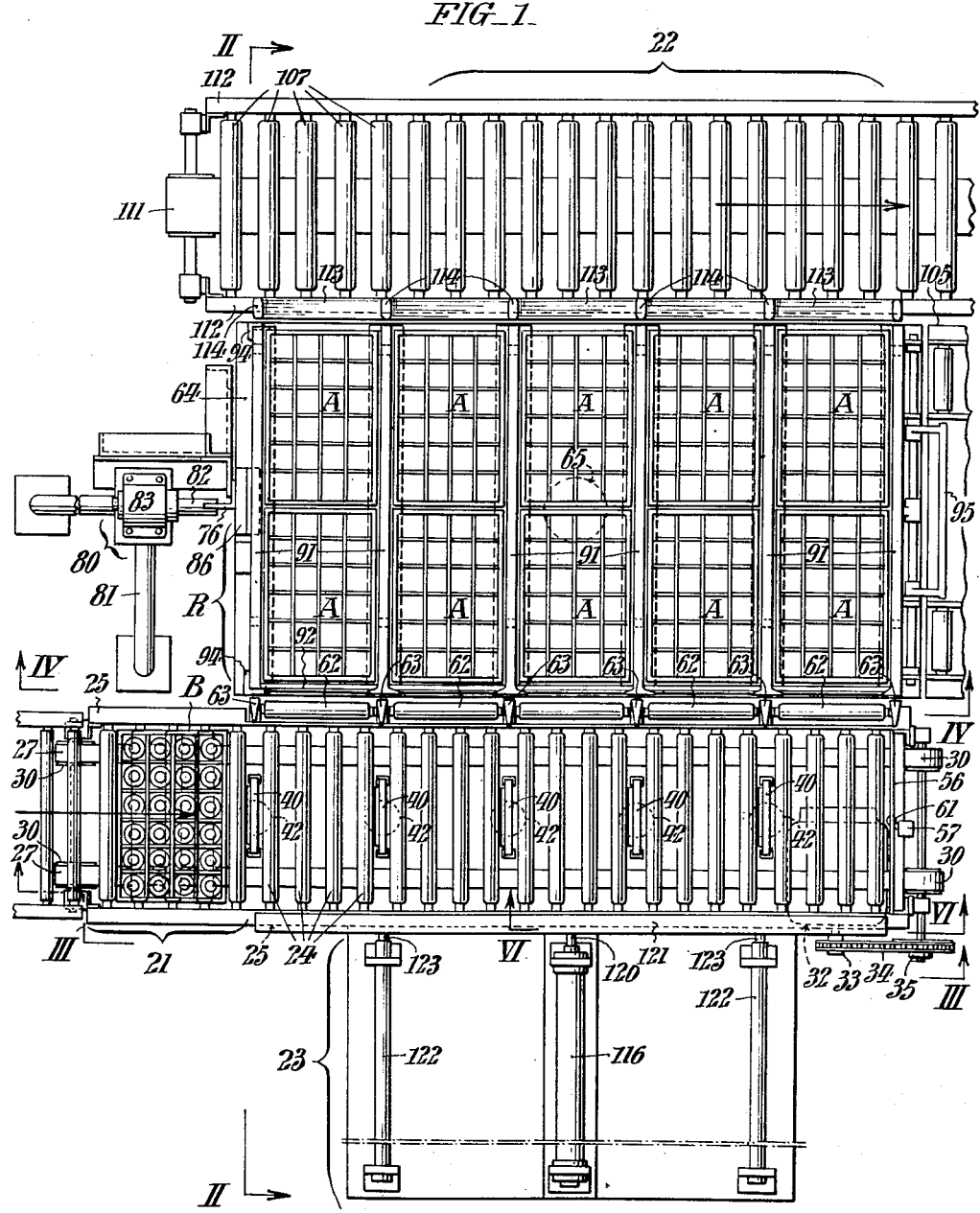

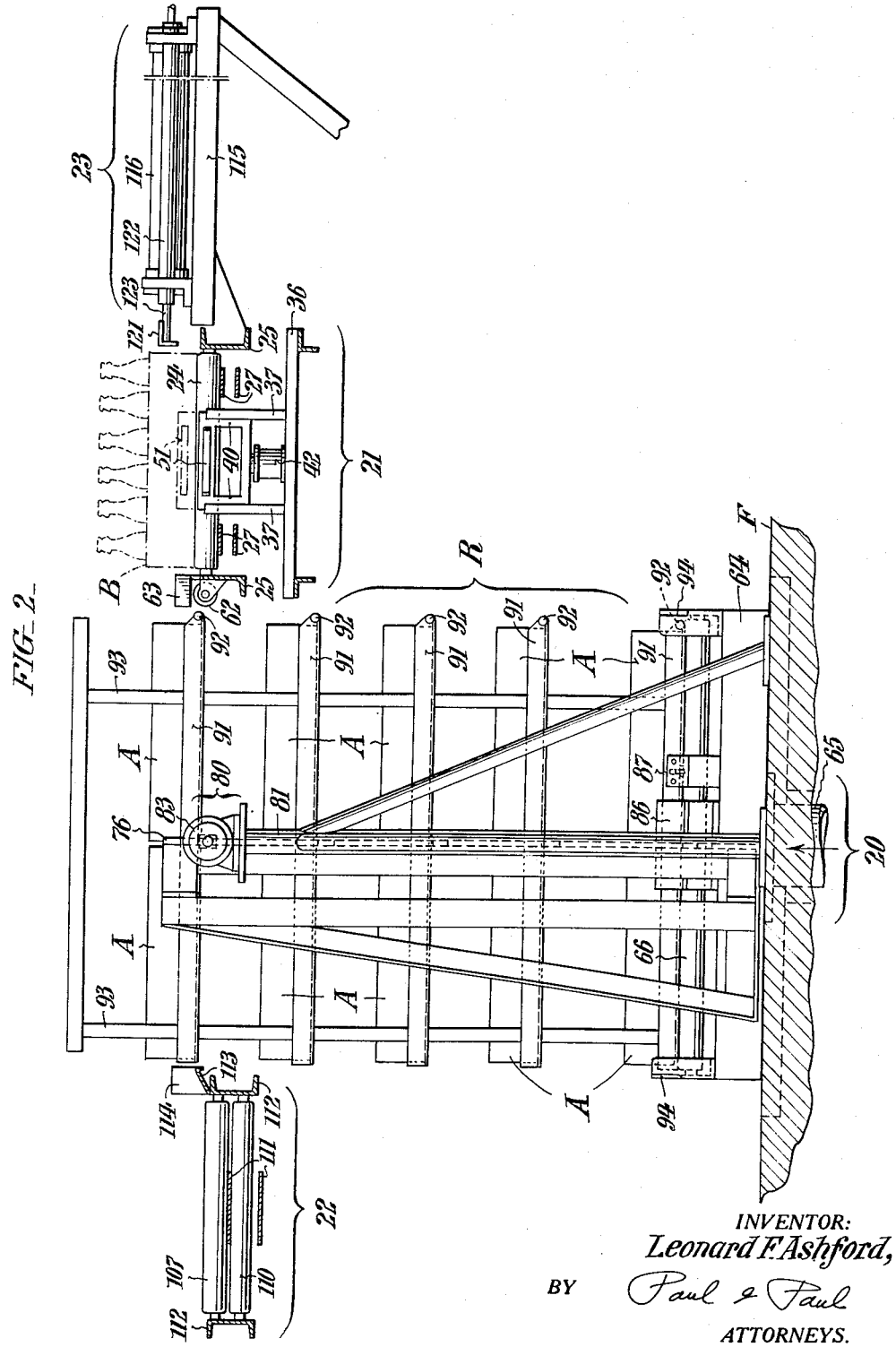

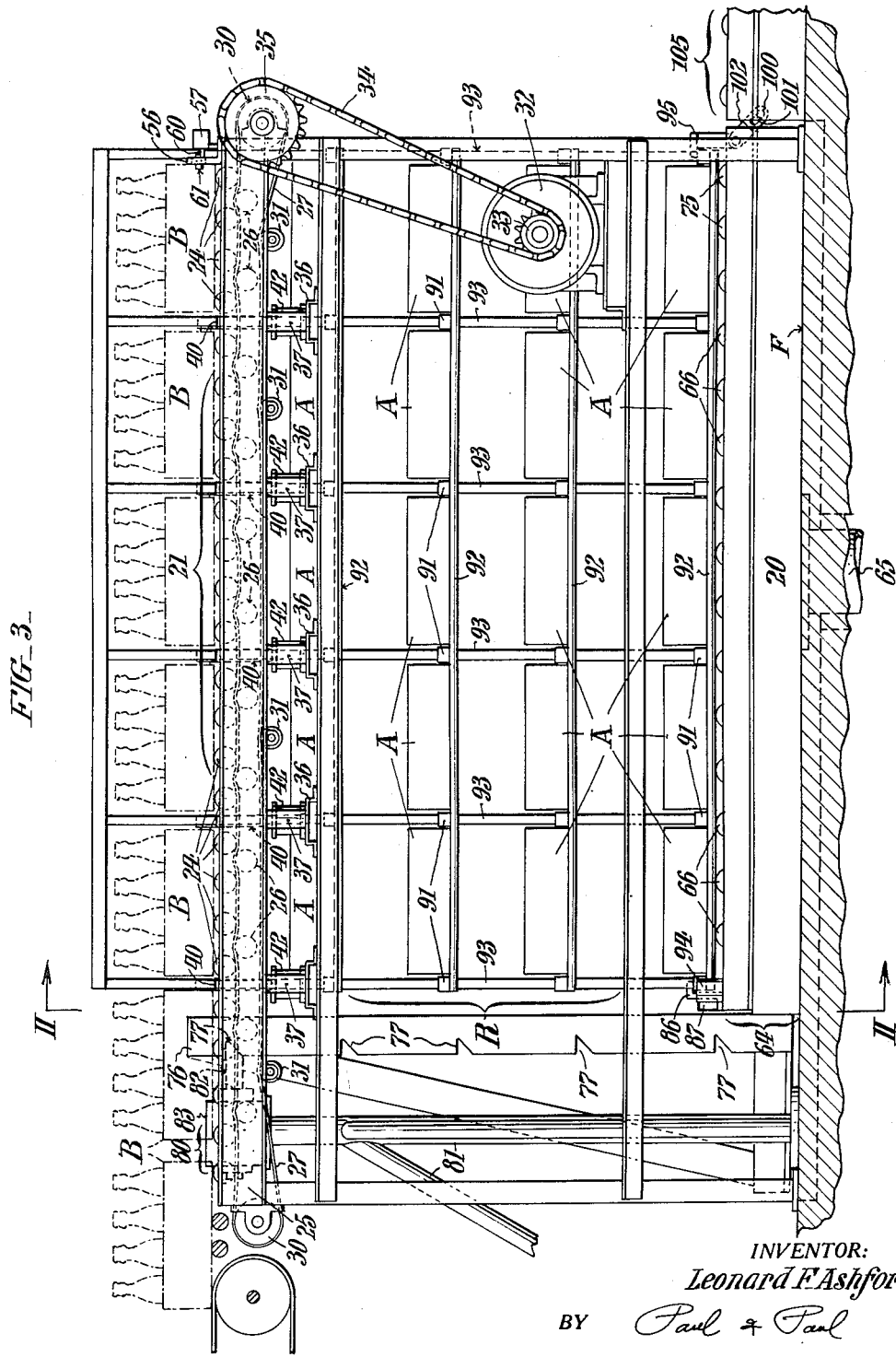

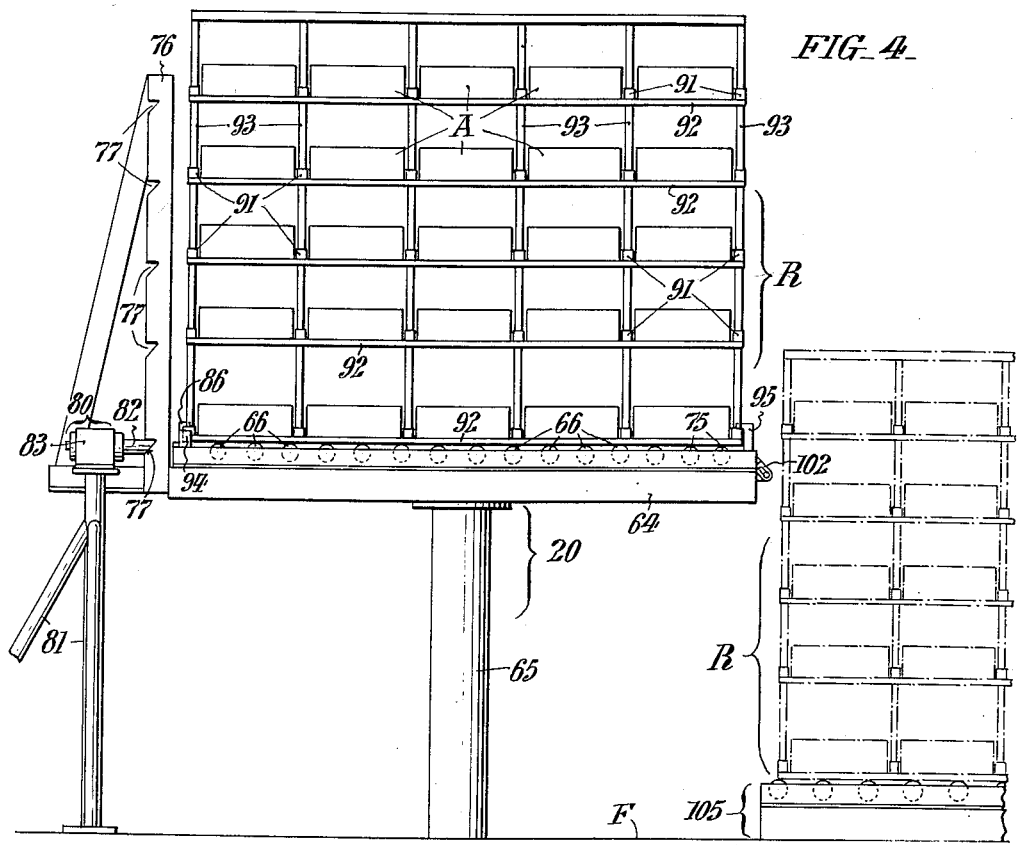
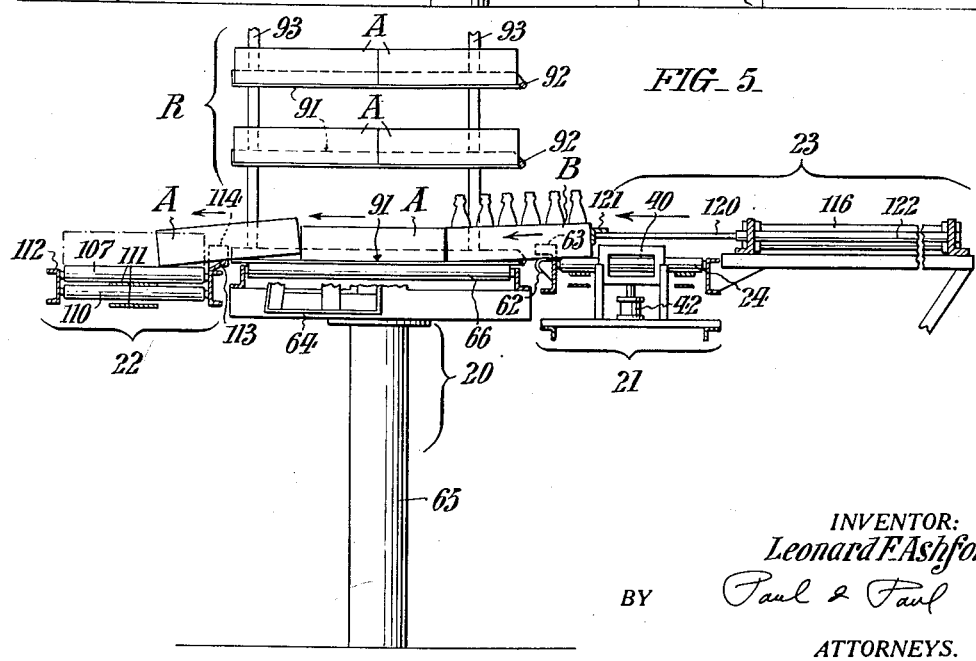

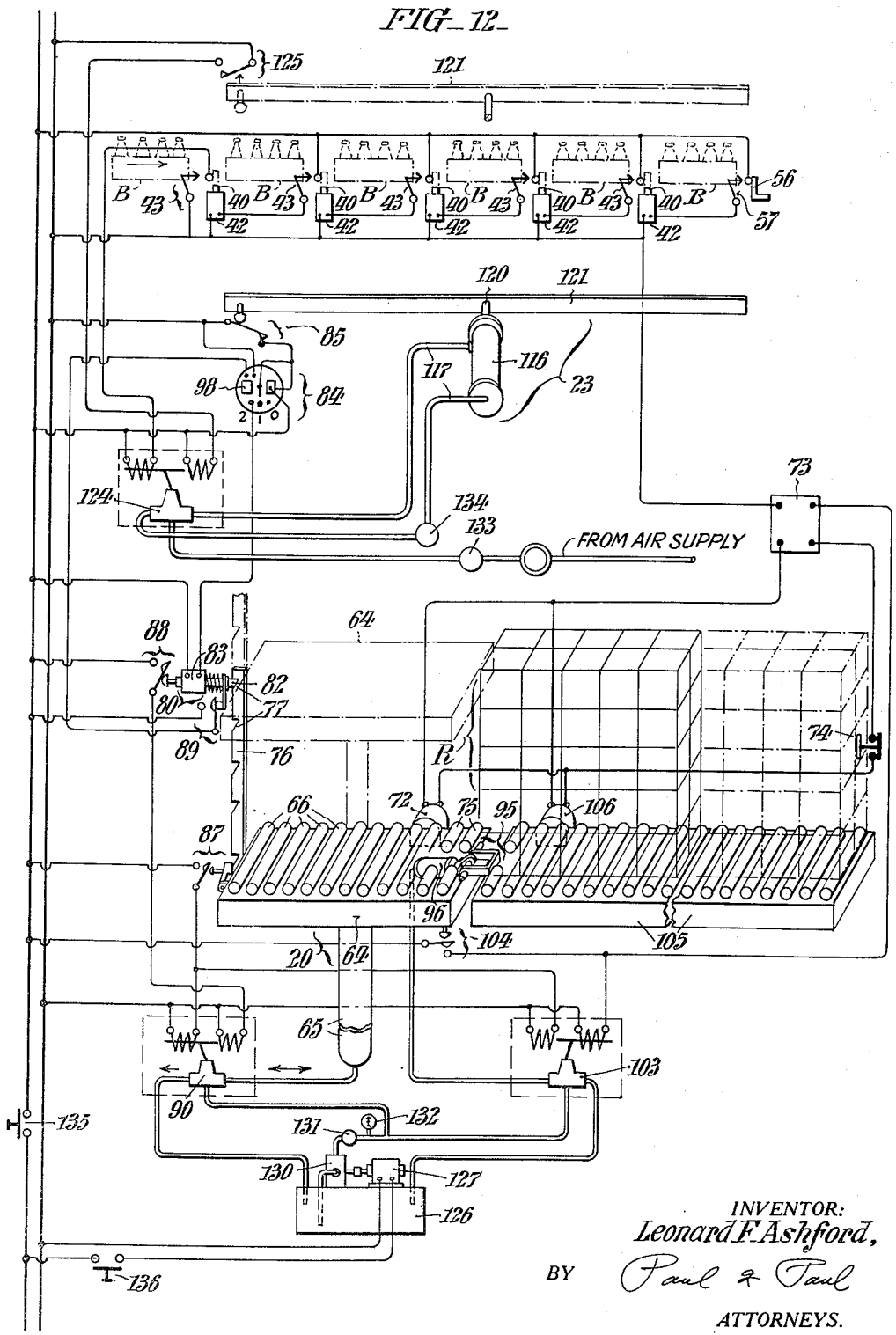

Patented Dec. 1, 1953

2,661,100

UNITED STATES PATENT OFFICE 2,661,100

ARTICLE HANDLING APPARATUS

Leonard F. Ashford, Philadelphia, Pa.

Application June 2, 1950, Serial No. 165,821

10 Claims. (Cl. 214—1)

1

This invention relates to article handling apparatus, and more particularly concerns automatic apparatus for loading articles into an article supporting structure and for removing other articles therefrom.

In operating industrial packaging plants such as bottling plants and the like, packages are advantageously transported from the plant and returned to the plant in composite units for economy and convenience in handling. For example, in bottling plants, I have found that high operating efficiency is attained by providing unitary palletized case racks adapted to hold large numbers of individual bottle cases in spaced rows and in spaced tiers. Such racks conveniently fit into the bodies of local delivery trucks or other conveyances and may readily be removed from the conveyances for transporting cases to and from the case unpacking and packing machinery of the bottling plant.

Previously a substantial proportion of manual labor has been employed in unloading the cases of empty bottles from a bottle delivery truck and additional labor changes have been incurred in re-loading the truck with cases of full bottles. Such operations have been at best unduly time-consuming and have materially increased the cost of delivery and collection of cases by rendering delivery trucks inoperative during protracted waiting periods. Substantial breakage of bottles and damage to cases is also frequently encountered when such articles are loaded and unloaded manually.

It is accordingly an object of the present invention to provide an efficient method and apparatus for handling articles for loading and unloading into and from an article delivery conveyance. Another object of the invention is to provide a continuous automatic high capacity article handling machine for simultaneously loading and unloading an article carrying support. Still another object of the invention is to provide apparatus and method for minimizing the waiting period involved in loading and unloading article delivery conveyances and for minimizing the damage to articles handled.

Still other objects and advantages of the invention, including the simplicity and ease of operation of the same, together with means for carrying such objects into effect, will become more fully apparent from the description of one practical embodiment of the invention which follows, having reference to the accompanying drawings.

In summary, the invention broadly constitutes method and means for positioning a set of spaced cases adjacent a case containing holder and for moving the spaced cases into the holder, thereby displacing from the holder the cases originally held thereby.

Of the drawings:

Fig. 1 represents a plan view of apparatus constituting one embodiment of the invention;

Fig. 2 represents a partial sectional end view of the same, taken as indicated by the line and arrows II—II which appear in Figs. 1 and 3;

Fig. 3 represents a side elevation of the same, taken as indicated by the lines and arrows III—III which appear in Fig. 1;

Fig. 4 represents a side sectional view of the same, taken as indicated by the lines and arrows IV—IV which appear in Fig. 1;

Fig. 5 represents a view similar to Fig. 2, illustrating the arrangement of elements for performing a step of the method of the invention;

Fig. 6 represents a fractional side elevation of apparatus of the invention, taken as indicated by the lines and arrows VI—VI which appear in Fig. 1;

Fig. 7 represents a sectional view taken as indicated by the lines and arrows VII—VII which appear in Fig. 6;

Fig. 8 represents a fractional side elevation illustrating in further detail the apparatus represented generally in the lower portions of Figs. 3 and 4;

Fig. 9 represents a sectional view taken as indicated by the lines and arrows IX—IX which appear in Fig. 8;

Fig. 10 represents a fractional sectional view illustrating details of the case spacing apparatus represented in Fig. 6;

Fig. 11 represents a sectional view taken as indicated by the lines and arrows XI—XI which appear in Fig. 10; and Fig. 12 represents a diagrammatic perspective view indicating the principal features of the assembled article handling machine, including associated electrical, hydraulic and pneumatic control devices, electric conductors being represented by single full lines and hydraulic and pneumatic conductors being represented by pairs of full lines.

In describing the form of my invention exemplified by the accompanying drawings, specific terms will be employed for the sake of clarity, but it is to be expressly understood that the scope of the invention is not thereby limited; each such term being intended to embrace all equivalents which perform the same function for an analogous purpose.

With specific reference to the drawings, there is shown a single embodiment of the invention as adapted for unloading empty cases A from case rack R and loading full cases B into a case rack R. Among the case handling elements of the apparatus represented in the drawings are the elevator 20 which is constructed to raise and lower the rack R, case delivery conveyor 21 which delivers and spaces the cases, case receiving conveyor 22, and case pusher 23 which serves to move full cases B from case delivery conveyor 21 into the case rack R and thereby to displace empty cases A from rack R to case receiving conveyor 22. It may be assumed that case rack R is constructed to carry spaced rows and tiers of cases, to fit into the load carrying compartment of a case delivery truck, and is also of palletized construction and adapted to be transported from the delivery truck to any desired location in the plant by means of a conventional fork lift truck.

Case delivery conveyor 21 consists broadly of means for conveying the cases into the apparatus and means for holding the cases in spaced apart relation.

The case conveying means of case delivery conveyor 21 embodies a plurality of parallel rollers 24 rotatably supported in horizontal alignment at a fixed level upon frame 25. Also rotatably supported on frame 25 and spaced below and longitudinally between rollers 24 are conveyor idler rolls 26. Conveyor drive belts 27 are disposed between the conveyor idler rolls 26 and rollers 24 and serve to rotate the rollers 24 to move the cases B along case delivery conveyor 21. Belts 27 are trained around end rolls 30 and have return portions supported on return idler rolls 31. The conveyor drive belts 27 are driven by electric motor 32, sprocket pinion 33, chain 34, and sprocket 35 which is drivingly attached to one end roll 30.

The case spacing means of case delivery conveyor 21 appears particularly in Figs. 6, 7, 10, and 11. Mounted on channel irons 36 are upright guide channels 37 which in turn accommodate the case spacer plates 40. Each case spacer plate 40 is attached to and supported on a rod 41 which is fitted at its lower end into a solenoid 42 which serves to raise and lower spacer plate 40 to maintain predetermined spacing of a full case B on delivery conveyor 21.

Referring particularly to Figs. 10 and 11, wherein the construction and arrangement of parts of the case spacing means appears in further detail, it will be noted that there is mounted on each spacer plate 40 a case actuated contact switch 43 mounted on channel piece 44 having a downturned end flange 45 forming a recess 46. Removably attached to spacer plate 40 by means of screw 47 is retainer plate 50 which extends above the bottom of the recess 46 in channel piece 44. Transverse stop bar 51 has upper and lower flanges 52, 53 which serve to engage end flange 45 and plate 50 to limit the extent of movement of stop bar 51 outwardly from the recess 46. A metallic electric contact piece 54 is secured to the back of transverse stop bar 51. Another metallic contact piece 55 is attached to the back of channel piece 44 in a position opposite contact 54. It will be apparent that movement of stop bar 51 toward the back of channel piece 44, which is in practice actuated by movement of case B to the dotted line position represented in Fig. 10, brings contacts 54 and 55 together. As will be apparent from Fig. 12, this closes a branch of an electric circuit which includes the solenoid 42 of the next adjacent spacer plate 40 thereby raising said adjacent plate 40 to a position in the path of the next advancing case B. Closure of each set of contacts 54 and 55 causes each adjacent spacer plate to rise, whereby the advancing cases are successively stopped and spaced with precision along the moving case delivery conveyor 21.

Another element of the case spacing means, attached to frame 25, is a fixed case stop 56 to which is attached electric switch 57 having arm 60 and attached switch arm roller 61 disposed in the path of advancement of cases B on case delivery conveyor 21. Electric switch 57 is actuated by contact with the initial advancing case B on case delivery conveyor 21 and is connected electrically to a solenoid 42 to raise the adjacent spacer plate 40 as previously described.

Longitudinally disposed case supporting rolls 62 and case guides 63 are supported on the frame 25, as shown. The elements 62 and 63 are useful in supporting cases B as they move laterally from case delivery conveyor 21 toward rack R, in a manner further to be explained.

The elevator 20 has a horizontal load supporting platform 64 mounted on upright elevator shaft 65 and adapted to move up and down on said shaft 65 and to seat in an accommodating recess in floor F. Rotatably mounted in a horizontal plane on platform 64 are a series of elevator conveyor rolls 66 which serve to support the load on the elevator platform. Also mounted on the elevator platform is a set of elevator conveyor idler rolls 67 which are spaced below and longitudinally intermediate the elevator conveyor rolls 66. Trained around elevator conveyor end rolls 70 are conveyor belts 71 which also travel between rolls 66 and 67 and serve to move the rolls 66 to convey the case rack R to and from the elevator 20. Belts 71 are driven conventionally by motor 72 which is connected electrically through conventional reversing starter 73 and normally closed switch 74 (see Fig. 12) for automatic starting, stopping and reversing of motor 72 in dependent relation to the movements of the elements of the apparatus. Section rolls 75, free of connection with belts 71, are rotatably mounted at one end of elevator platform 64 in a common horizontal plane with elevator conveyor rolls 66.

Rigidly attached to elevator platform 64 is an upright 76 having uniformly spaced notches 77. A solenoid operated latch mechanism 80, supported on standard 81, is positioned adjacent elevator platform 64. The latch mechanism 80 has a spring urged notch engaging arm 82 shaped to fit into notches 77 and to hold the elevator platform 64 at any one of a number of predetermined levels governed by the positions of notches 77 on upright 76. Latch mechanism 80 includes a conventional solenoid 83 connected electrically to the apparatus and effective to engage and disengage arm 82 with and from notches 77, all in synchronization with the sequence of operations of the apparatus.

Having reference to Fig. 12, it will be understood that the solenoid 83 operating the latch mechanism 80 is connected electrically through a conventional counter-switch 84. Motion counting devices such as mechanical and electrical counters are well known in the art, and are not of themselves claimed. Latch mechanism 80 is also connected electrically through a spring urged switch 85, and is actuated automatically and in definite relation to the sequence of operations of the apparatus. Also it will be noted that a switch 88 is disposed immediately adjacent to the free end of arm 82 and is connected electrically to one side of solenoid valve 90. A switch 89 is disposed in the path of movement of latch arm 82 toward notches 77 and is connected electrically to reset coil 98 of counterswitch 84.

Attached in fixed position to the rear of the elevator platform 64 are a rack stop 86 and a rack actuated switch 87. Switch 87 is connected electrically to solenoid valve 90 for automatic operation of the elevator when switch 87 is closed by reason of the movement of rack R on the elevator platform 64.

Case rack R desirably consists of a plurality of accurately spaced transverse beams 91, side beams 92 and vertical beams 93 secured together to form a framework constructed to hold the cases A and B in spaced rows on a common horizontal plane and to hold such horizontal rows on elevator 20 in successive tiers spaced vertically above and below one another.

Referring also to Fig. 8, the elevator 20 has rack spacing means including stationary rack stop 86, angle irons 94 which restrain rack R against movement laterally, and movable rack clamp 95 which is pivotally mounted on elevator platform 64 for movement to and from the solid and dash line positions appearing in Fig. 8. Hydraulic cylinder 96 has piston arm 97 which carries the stud 100, disposed within slot 101 of lever arm 102 of clamp 95. Clamp 95 is positioned accurately on elevator platform 64 and serves to bring the individual cases in rack R into longitudinal positions corresponding to the positions of the cases spaced on case delivery conveyor 21. Hydraulic cylinder 96 is connected to a hydraulic pressure system for automatic closure of clamp 95 by solenoid valve 103 upon closure of switch 87, and for automatic opening of clamp 95 upon closure of switch 104 (see Fig. 12).

A rack conveyor 105 is disposed forwardly of and adjacent to the elevator 20 and consists of conveyor elements similar to those previously described in connection with conveyor 21. Rack conveyor 105 is conventionally driven by a reversible motor 106 which is electrically connected through reversing starter 73 and normally closed switch 74 (see Fig. 12) for automatically starting, stopping, and reversing the motor 106 in predetermined relation to the sequence of operations of the case handling machine. Switch 104 which is connected into an electric conduit leading to reversing starter 73 and is positioned below the elevator platform 64, also controls the operation of rack conveyor 105.

Case receiving conveyor 22 is positioned adjacent elevator 20 on the side opposite to case delivery conveyor 21. Conveyor 22 has a plurality of upper and lower case handling rolls 107 and 110 together with a centrally disposed belt 111, the rolls 107 and 110 being rotatably disposed on longitudinal beams 112, driven conventionally by means of an electric motor (not shown), and effective to transport cases displaced from rack R to another location in the plant for further processing. Conveyor 22 is desirably horizontal and disposed at a level slightly below the level of conveyor 21. Inclined case skids 113 and guide pieces 114 are attached to the inner longitudinal beam 112, serving to guide the cases to case receiving conveyor 22.

Case pusher 23 is supported on frame 25 and on angle iron 115 adjacent to case delivery conveyor 21. The centrally mounted cylinder 116, connected to air supply lines 117 (see Fig. 12), serves to advance and retract piston rod 120 to which is attached the pusher bar 121. Having reference particularly to Fig. 5, it will be noted that pusher bar 121 is at a level above the top of spacer plates 40 when these are in raised position. Guide sleeves 122 are attached to the support and disposed parallel to cylinder 116. Guide rods 123 are slidably disposed within the guide cylinder 122 and connected to pusher bar 121. Referring particularly to Fig. 12 of the drawings, it will be noted that solenoid valve 124 is connected into the air supply line 117 and is connected electrically to the contact switch 43 of the endmost spacer plate 40 for automatic advancement of the pusher bar 121 when the final case B is stopped and spaced on case delivery conveyor 21. Solenoid valve 124 is also connected electrically to spring urged switch 125 which is disposed in the path of advancement of pusher bar 121 and effective to actuate pneumatically the retraction of pusher bar 121 upon completion of its advance stroke. Thus it will be apparent that pusher 23 constitutes pneumatically actuated means for advancing cases from case delivery conveyor 21 to rack R which is positioned on elevator 20, and for thereby displacing cases previously situated on rack R to case receiving conveyor 22. Having reference particularly to Fig. 1, it will be noted that spacer plates 40, case guides 63, and guide pieces 114 are positioned in lateral alignment and serve to define the lateral paths of the cases moved by pusher bar 121.

The apparatus for supplying hydraulic fluid under pressure, represented schematically in Fig. 12, comprises a reservoir 126, motor 127, pump 130, valve 131, and gauge 132 together with conduits as indicated. Such apparatus is conventional and forms no part of the invention.

The apparatus for supplying air under pressure to pusher cylinder 116 desirably includes the pressure regulator valve 133 and flow regulator valve 134. Such apparatus is likewise conventional and is not claimed as a part of the invention.

The operation of the apparatus disclosed will readily be apparent, having reference particularly to Fig. 12, wherein the elements of the device are represented in positions for advantageously starting the cycle of operation.

The cycle of operation is begun by removing a case-containing rack R from the body of a case delivery truck. Such rack R ordinarily contains cases full of empty bottles. However for purposes of this invention it is immaterial what the cases contain and empty cases A are represented in the drawings for the sake of clarity. The removal of rack R from the delivery truck is conveniently effected by means of an industrial fork lift truck, the rack R having a palletized structure for convenient accommodation of the forks of such lift truck. Rack R is carried on the fork lift truck to rack conveyor 105 and deposited thereon. The automatic cycle of the apparatus of the invention is then started by closing switches 135 and 136, thereby energizing motors 72 and 106 and advancing rack R to a position on elevator conveyor rolls 66. The rack R advances to the rack stop 86 at the rear end of the elevator platform 64, thereby closing rack actuated switch 87. This energizes solenoid valve 90 permitting hydraulic fluid to raise the elevator platform 64 to the dotted line position illustrated in Fig. 12, sliding the notches 77 past the spring urged arm 82 which eventually engages the lowermost notch 77 to hold the elevator platform 64 and rack R at predetermined levels. In such position the lower tier of cases A on rack R is at substantially the same level as case delivery conveyor 21 (see also Fig. 5).

Closure of switch 87 also energizes solenoid valve 103 thus admitting hydraulic fluid to hydraulic cylinder 96, raising clamp 95 to the solid line position shown in Fig. 8. Rack R is thereby positioned accurately in a longitudinal sense on elevator platform 64.

Concurrently with the foregoing, the cases B on case delivery conveyor 21 proceed forwardly until the leading case strikes fixed case stop 56 also closing the corresponding electric switch 57. This energizes the adjacent solenoid 42, raising the corresponding spacer plate 40. The next successively advancing case B strikes case actuated contact switch 43, energizing the next adjacent solenoid 42 thereby stopping and spacing said next case B on case delivery conveyor 21. Such procedure continues until all the cases B are stopped and held at predetermined spacing on case delivery conveyor 21 in registry with cases A of rack R.

Closure of the last switch 43 energizes solenoid valve 124 thereby permitting air to enter cylinder 116, advancing pusher bar 121 toward the cases B. The pusher bar 121 contacts the entire row of cases B, pushing them laterally onto rack R thereby displacing a row of empty cases from rack R to case receiving conveyor 22, as represented in particular detail in Fig. 5. The advancement of pusher bar 121 closes switch 125 reversing the setting of solenoid valve 124 and thereby retracting pusher bar 121. On retracting, pusher bar 121 contacts and closes switch 85 thereby actuating counter-switch 84 moving the motion counting switch element of counter-switch 84 to the number one position, as indicated in Fig. 12.

Removal of the cases B from case delivery conveyor 21 permits the case actuated contact switches 43 to open. Accordingly the spacer plates 40 drop and another row of cases B advances on case delivery conveyor 21. This second row of cases B is spaced out on case delivery conveyor 21, eventually actuating the pusher bar 121 as previously described, and moving said second row of cases B to rack R. The retraction of pusher bar 121 again closes switch 85, moving counter-switch 84 to the number two counted position, closing the electric circuit through latch solenoid 83. The solenoid 83 pulls arm 82 rearwardly withdrawing it from lowermost notch 77. Upon withdrawal, arm 82 contacts and closes switch 88 which reverses the setting of solenoid valve 90. Accordingly hydraulic fluid is bled out of the elevator cylinder lowering platform 64. During withdrawal, arm 82 also closes switch 89 thereby resetting counter-switch 84 to the zero position, deenergizing solenoid 83. Spring-urged latch arm 82 then engages the next higher notch 77 of upright 76. This brings the cases A in the next higher tier of rack R into registry with the cases B of case delivery conveyor 21. The cycle of operations is then repeated as previously described, each row of each tier of cases A being displaced by rows of cases B until the rack R is completely loaded with cases B.

On completing the last loading cycle in which the top tier of rack R is loaded, the elevator platform 64 moves downwardly to a very slight extent, closing switch 104, which energizes reversing starter 73 and starts the motors 72 and 106, moving the loaded rack R toward normally closed switch 74. The rack R then reaches the position represented by dotted lines in Fig. 12, contacts and opens switch 74, and breaks the circuit stopping the conveyor motors 72 and 106. Another case rack R is then placed by means of a fork lift truck on rack conveyor 105 in the position as represented in solid lines in Fig. 12. The fork lift truck then removes the filled case rack, shown in dotted lines in Fig. 12, permitting switch 74 to close. This again energizes the reversing starter 73 which then starts the motors 72 and 106 in a reverse direction, and the rack just placed on rack conveyor 105 moves onto elevator conveyor rolls 66, thereby closing switch 87 and starting the entire cycle for repetition as previously described.

It will be appreciated that the displacement of articles from rack R by insertion of spaced adjacent articles may be accomplished in a variety of ways in accordance with the invention. For example, in changing the relative elevation of cases A and B, either or both of the supporting structures for said cases may be mounted on an elevator platform and may be raised and lowered to bring the cases into registry. Further, the respective cases may be brought into registry longitudinally and vertically by other analogous means found to be desirable or expedient. It will be appreciated that the cases are considered to be in registry when they occupy relative positions whereby a portion of one case, on advancing under the influence of the pushing means, will contact a portion of the other case to displace the other case from its initial position.

In place of the hydraulically operated elevators represented in the drawings, other devices capable of changing the respective levels of the cases A and B may be substituted and all such devices are intended to be embraced by the term "elevator." It will also readily be understood that the construction, wiring, piping, and like features of the apparatus may be modified without departing from the scope of the invention. Likewise while the apparatus has been described specifically with reference to the handling of bottle-carrying cases, it will be appreciated that the apparatus and method of the invention are equally applicable for handling other articles and objects of various shapes and sizes.

It will also be understood that numerous other changes may be made in the form of the device, including, but not limited to, reversals of parts and substitutions of mechanical equivalents for the various mechanisms herein represented. Changes in the sequence of the steps of the method may also be resorted to without departing from the scope of the invention, and various other features of the invention may be used independently of the use of other features, all within the spirit and scope of the invention as defined in the annexed claims.

Having thus described my invention, I claim:

1. Case handling apparatus comprising a case elevator, means for raising and lowering said case elevator, a case receiving conveyor adjacent said case elevator at one side, a case delivering conveyor and a case pusher adjacent said elevator at the side opposite the case receiving conveyor, a case rack, means for bringing said rack on the elevator, a fixed stop on said elevator, means for moving said rack against said stop and thereby bringing the cases on said rack into registry with the cases on the case delivery conveyor, means for actuating the pusher when the cases are in registry, said pusher being constructed and arranged to push cases from the case delivery conveyor to the elevator, thereby displacing cases from the elevator to the case receiving conveyor, and means for actuating said elevator in response to the movement of said pusher.

2. Case handling apparatus comprising a unitary palletized case rack constructed to carry cases in definitely spaced tiered relation, an elevator, means for maintaining said case rack in fixed predetermined longitudinal position on said elevator, a case delivery conveyor adjacent said elevator, means for maintaining cases on said delivery conveyor in registry with the cases carried by one tier of said case rack, means for pushing the cases from the delivery conveyor onto the rack when said cases are in registry, thereby displacing cases in corresponding positions therefrom, an upright attached to said elevator, a series of indentations spaced along said upright at relative distances corresponding to the spacing of the tiers of said rack, latch means constructed for engagement in said indentations to maintain a tier of said case rack in registry with said case delivery conveyor, and means actuated by the return motion of the case pushing means to bring the latch out of engagement with one of said indentations, to change the elevation of the elevator, and to engage the latch with an adjacent indentation of said upright to bring an adjacent tier of said case rack into registry with said case delivery conveyor.

3. Case handling apparatus comprising an elevator, a unitary case rack constructed to carry cases in definitely spaced relation, means for transporting said rack to said elevator, rack spacing means in the form of a clamp actuated by the rack when positioned on the elevator, said clamp being constructed and arranged to maintain the rack in predetermined fixed position on the elevator, a case delivery conveyor adjacent said elevator, means for spacing cases on said delivery conveyor in registry with cases carried by said rack, and means for pushing the cases from the delivery conveyor on to said rack, thereby displacing cases from said rack.

4. Case handling apparatus comprising a case elevator, a case conveyor adjacent said elevator, means in the form of a rack and rack clamp for maintaining cases in predetermined spaced relation on said elevator, said clamp serving to secure the rack on said elevator, means for maintaining cases on the case conveyor in registry with the cases on the elevator, a pusher constructed and arranged to push cases from said conveyor on to said rack thereby displacing cases therefrom, first switch means actuated by contact with a case to energize the pusher when the respective cases are in registry, and second switch means actuated by the movement of said pusher after displacing said cases to elevate said case elevator.

5. Case handling apparatus comprising an elevator, a case rack having spaced tiers constructed to hold cases in predetermined spaced relation on said elevator, means for placing said rack on said elevator, retaining means actuated when the rack is placed on the elevator to retain said rack in fixed position on said elevator, a case delivery conveyor adjacent said elevator, stop means on said case delivery conveyor constructed and arranged to maintain a row of cases on said conveyor in registry with the cases in a tier of said case rack, a case pusher constructed and arranged to push a row of cases from said conveyor on to the case rack when the cases come into registry and thereby to displace cases from a tier of the case rack, means constructed to return the pusher to its initial position upon completion of its advance movement, elevation changing means actuated by the return motion of the case pusher for changing in predetermined amount the elevation of the elevator, said elevation changing means being effective to bring the cases of another tier of the case rack into registry with the cases on said case conveyor, and means for actuating said pusher when said other tier is thus in registry.

6. Case handling apparatus comprising an elevator, means for changing the elevation of said elevator, a case rack on said elevator, said case rack being constructed to carry multiple horizontal rows and vertical tiers of cases in definitely spaced relation, a case conveyor adjacent said elevator, means for bringing a row of cases on said case conveyor and maintaining said cases in alignment with the rows of one tier of cases carried by said case rack, means for pushing successive rows of cases from the case conveyor onto said case rack to displace successive rows of cases from one tier of the case rack, and counting means connected to the pushing means and to the elevation changing means, said counting means being constructed and arranged to effect a change in the elevation of the elevator to bring another tier of the case rack into vertical registry with the case conveyor following the displacement of counted rows of one tier of cases from said case rack.

7. Article handling apparatus comprising an elevator, an article holder constructed to carry articles in definitely spaced relation, conveyor means for transporting said article holder to said elevator, retaining means actuated in response to the movement of said article holder on said elevator to maintain said holder in fixed position on said elevator, an article delivery conveyor adjacent said elevator, means for spacing articles on said delivery conveyor in registry with the articles carried by said holder, and means for moving the cases from the delivery conveyor on to said holder, thereby displacing articles from said holder.

8. Article handling apparatus comprising an article elevator, an article rack, reversible rack conveyor means for moving said article rack bodily to and from said elevator, rack aligning means in the form of a power-operated rack clamp for aligning the rack on the elevator, an article conveyor, positioning means for bringing the articles on the article conveyor into registry with the rack on said elevator, a pusher constructed to move articles from said conveyor to said rack, means for changing the relative elevation of said article conveyor and elevator, and switch means disposed at a predetermined level and actuated in response to said change of relative elevation to energize said article rack conveyor means to remove said article rack from said elevator.

9. Beverage case handling apparatus comprising a palletized case rack constructed to carry a plurality of cases in spaced, tiered relation, an elevator for the rack, means for placing a rack which contains cases of empty bottles on said elevator, means for raising the elevator and rack, retaining means on said elevator for maintaining said rack in fixed position on said elevator, means for spacing out cases of full bottles at a given level adjacent said rack in registry with one tier of the cases in the rack, and means for moving the cases of full bottles into the rack, thereby displacing from the rack the cases of empty bottles, and means for lowering the elevator to bring successive tiers of the rack to said given level and means for successively displacing the cases of empty bottles from said tiers.

10. Beverage case handling apparatus comprising a palletized case rack constructed to carry a plurality of cases in spaced, tiered relation, an elevator for the rack, means for placing a rack which contains cases of empty bottles on said elevator, means for raising the elevator and rack, a fixed stop on said elevator, rack aligning means also on said elevator operable to urge said rack against said fixed stop, power means for operating said aligning means, means for spacing out cases of full bottles at a given level adjacent said rack in registry with one tier of the cases in the rack, thereby aligning the cases of full bottles and the cases of empty bottles, and means for moving the cases of full bottles into the rack, thereby displacing from the rack the cases of empty bottles, and means for lowering the elevator to bring successive tiers of the rack to said given level and means for successively displacing the cases of empty bottles from said tiers.

LEONARD F. ASHFORD.

References Cited in the file of this patent

UNITED STATES PATENTS

| Number | Name | Date |
|---|---|---|
| 1,559,199 | Straight | Oct. 27, 1925 |
| 1,642,992 | Fuller | Sept. 20, 1927 |
| 1,766,251 | Greenleaf | June 24, 1930 |
| 1,779,210 | Davis | Oct. 21, 1930 |
| 1,900,150 | Anderson | Mar. 7, 1933 |
| 2,307,413 | Loux | Jan. 5, 1943 |
| 2,508,861 | Jessen | May 23, 1950 |
| 2,549,341 | Sperling | Apr. 17, 1951 |